United States Patent
Kuhn et al.

(10) Patent No.: US 6,327,565 B1
(45) Date of Patent: *Dec. 4, 2001

(54) SPEAKER AND ENVIRONMENT ADAPTATION BASED ON EIGENVOICES

(75) Inventors: Roland Kuhn; Jean-Claude Junqua, both of Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/070,208

(22) Filed: Apr. 30, 1998

(51) Int. Cl.[7] .................. G01L 15/14; G01L 15/06
(52) U.S. Cl. .................. 704/255; 704/254; 704/256
(58) Field of Search ............................. 704/231, 236, 704/251, 255, 256

(56) References Cited

U.S. PATENT DOCUMENTS

| | | | |
|---|---|---|---|
| 4,718,093 | | 1/1988 | Brown ................................ 704/243 |
| 4,908,865 | * | 3/1990 | Doddington et al. ............... 704/241 |
| 5,737,487 | * | 4/1998 | Bellegarda et al. ................ 704/250 |
| 5,864,810 | * | 1/1999 | Digalakis et al. .................. 704/255 |
| 5,960,397 | * | 9/1999 | Rahim ................................ 704/244 |
| 6,112,175 | * | 8/2000 | Chengalvarayan ................. 704/256 |

OTHER PUBLICATIONS

Rabiner, L., Juang, B.H., Fundamentals of Speech Recognition, Prentice Hall, 1993, pp. 69–122.*

Flaherty, M.J., and Roe, D.B., "Orthogonal transformations of stacked feature vectors applied to HMM speech recognition", Communications, Speech, and Vision, IEE Proceedings I, vol. 140, No. 2, pp. 121–126, Apr. 1993.

* cited by examiner

*Primary Examiner*—Tālivaldis Ivars Šmits
*Assistant Examiner*—Angela A. Armstrong
(74) *Attorney, Agent, or Firm*—Harness, Dickey & Pierce, P.L.C.

(57) ABSTRACT

A set of speaker dependent models is trained upon a comparatively large number of training speakers, one model per speaker, and model parameters are extracted in a predefined order to construct a set of supervectors, one per speaker. Principal component analysis is then performed on the set of supervectors to generate a set of eigenvectors that define an eigenvoice space. If desired, the number of vectors may be reduced to achieve data compression. Thereafter, a new speaker provides adaptation data from which a supervector is constructed by constraining this supervector to be in the eigenvoice space. The resulting coefficients in the eigenspace of this new speaker may then be used to construct a new set of model parameters from which an adapted model is constructed for that speaker. Environmental adaptation may be performed by including environmental variations in the training data.

16 Claims, 3 Drawing Sheets

SPEAKER AND ENVIRONMENT ADAPTATION BASED ON EIGENVOICES

BACKGROUND AND SUMMARY OF THE INVENTION

The present invention relates generally to speech recognition and more particularly to speaker adaptation whereby the parameters of a speech recognition model are revised to better recognize the speech of a new speaker.

Speech recognition systems may be speaker dependent or speaker independent. Speaker dependent systems are trained to understand what a single individual says, by being given a large number of examples of words uttered by that individual (these examples are called the "training data"). Speaker dependent systems tend to be very accurate for the individual they are trained on, and inaccurate for everybody else. Speaker independent systems are designed to be used by anybody who speaks the language of the application; typically, they are trained on data from many different people. The error rate for a speaker independent system, carrying out recognition on a speaker not in the training data, is roughly two to three times higher than the error rate for a comparable speaker dependent system carrying out recognition on the speaker it is trained on.

In an effort to improve performance, many speech recognition systems include facilities for performing speaker adaptation, whereby the speech recognition system is adjusted during use to reduce the error rate. There are basically three speaker adaptation approaches described in the current technical literature. These are:

(1) Speaker normalization (also called "transformation")—observations of the digitized signal generated by the new speaker feature vectors are transformed to resemble more closely observations from a reference speaker, for whom a speaker dependent system has been trained. In some instances the transformation is in the opposite direction: a reference pattern is transformed to resemble the data from the new speaker more closely.

(2) Speaker clustering—observations of the new speaker are used to select a cluster of training speakers; each cluster is associated with a complete set of Hidden Markov Models (HMMs) trained only on the speakers in this cluster. Once the cluster most suitable for the speaker has been chosen, recognition is carried out using only HMMs from this cluster.

(3) Model adaptation—certain HMM parameters are updated to reflect aspects of the adaptation data. The two most popular model adaptation techniques are maximum a posteriori estimation (MAP) and maximum likelihood linear regression (MLLR).

While each of these adaptation techniques has proven to be beneficial, none is without some drawback. Generally speaking, the more effective adaptation techniques tend to require significant computational resources and also require a significant training effort on the part of the individual speaker.

The present invention brings an entirely new technique with which to carry out speaker and environment adaptation. The technique enables an initially speaker independent recognition system to quickly attain a performance level on new speakers and new acoustic environments that approach speaker dependent systems, without requiring large amounts of training data for each new speaker. We call our technique "eigenvoice adaptation." The technique employs an offline step in which a large collection of speaker dependent models is analyzed by principal component analysis (PCA), yielding a set of eigenvectors that we call "eigenvoice vectors" or "eigenvoices." This offline step is fairly computationally intensive, although it has to be performed only once. After that, each time the speech recognition system is used, it carries out a computationally inexpensive operation on adaptation data obtained from the new speaker, to obtain a vector in the space spanned by the eigenvoices. This new vector gives the adapted model for the new speaker.

Unlike model adaptation techniques such as MAP and MLLR, most of the expensive computation occurs offline in the PCA step. This allows the invention to perform speaker or environment adaptation quite quickly and with little computational expense as the recognition system is being used.

Part of the power of the invention derives from the eigenvoice representation of the collective set of training speakers and of the new individual speaker for which the recognition system is being adapted. In other words, the eigenspace developed during the PCA step represents the collective speech traits of all the training speakers. The individual eigenvectors that define this n-dimensional space are each uncorrelated or orthogonal and are listed in order of importance for explaining variation in the data. Our experience has shown that the highest order eigenvector in this array may represent a male-female dimension. When this eigenvector receives a positive weight then the speaker is likely to be male; when this eigenvector receives a negative weight then the speaker is likely to be female. However, it should be understood that is the individual eigenvectors are not assigned a priori to any physical differences among speakers. Rather, the eigenvectors derive entirely from the training data when PCA is performed upon it.

As a new speaker uses the speech recognizer during adaptation, the model output parameters are constrained to be a linear combination of the previously determined eigenvoices. In other words, the speaker dependent model being trained on the new speaker must lie within the eigenvoice space previously defined by the training speakers. This is a comparatively inexpensive computational operation. The technique quickly generates a good speaker dependent model even if only a small quantity of adaptation speech is used. The technique thus lends itself to speaker and environment adaptation applications where a large quantity of adaptation data may not be available. For example, the technique would work well in a speech-enabled interactive marketing system where the new speaker responds by telephone to system navigation prompts and the system adapts to the new speaker automatically as the speaker proceeds to navigate through the system to place an order.

For a more complete understanding of the invention, its objects and advantages, refer to the following specification and to the accompanying drawings.

DESCRIPTION OF THE PREFERRED EMBODIMENT

To better understand the speaker adaptation technique of the invention, a basic understanding of the speech recognition system will be helpful. Most present day speech recognizers employ Hidden Markov Models (HMMs) to represent speech. The Hidden Markov Model is a modeling approach involving state diagrams. Any speech unit (such as a phrase, word, subword, phoneme or the like) can be modeled, with all knowledge sources included in that model. The HMM represents an unknown process that produces a sequence of observable outputs at discrete intervals, the outputs being members of some finite alphabet (corresponding to the predefined set of speech units). These models are called "hidden" because the state sequence that produced the observable output is not known.

Figure 1:
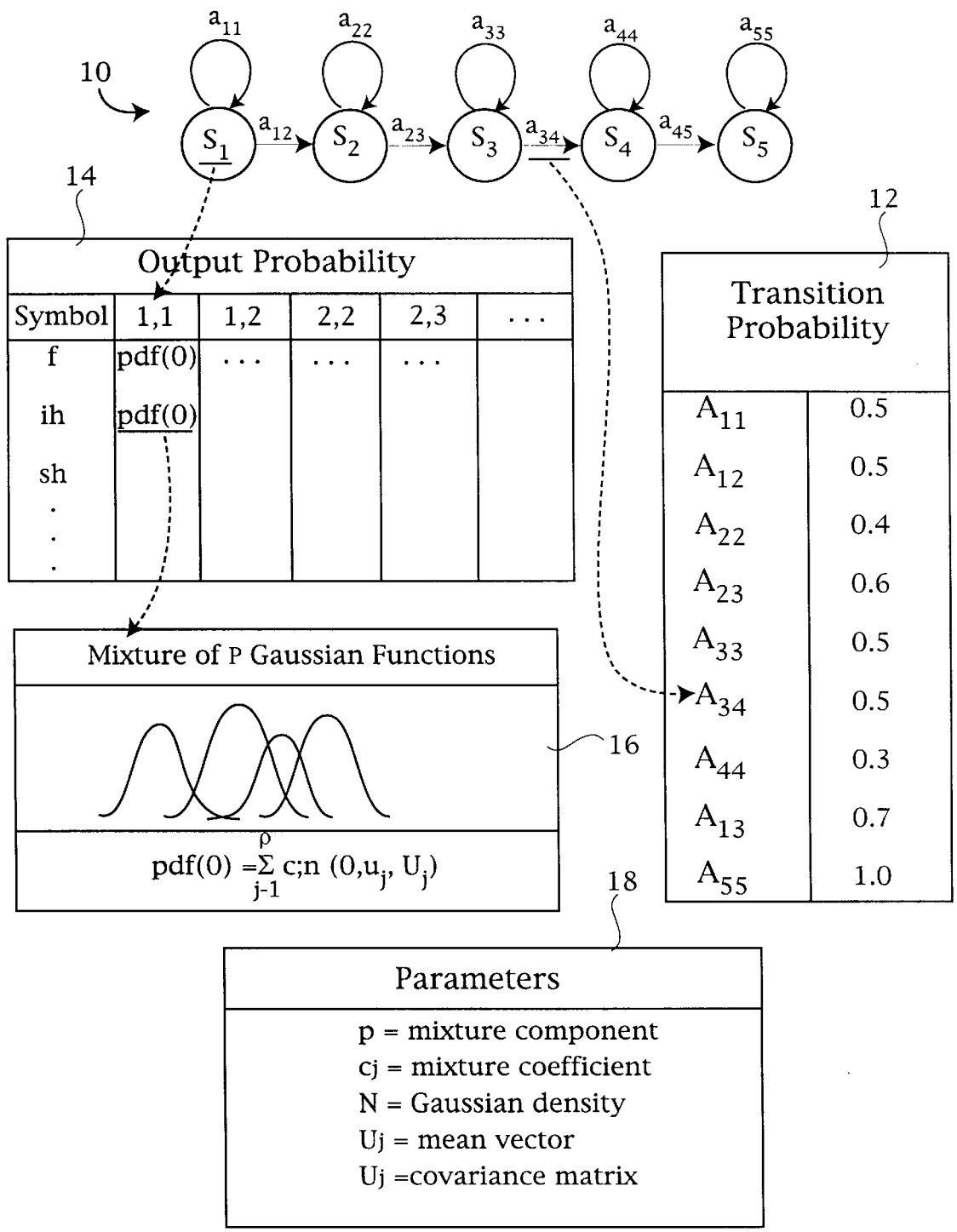
FIG. 1 illustrates an exemplary Hidden Markov Model (HMM), useful in understanding the invention.

As illustrated in FIG. 1, an HMM 10 is illustrated by a set of states ($S_1$, $S_2$, . . . $S_5$), vectors that define transitions between certain pairs of states, illustrated as arrows in FIG. 1, and a collection of probability data. Specifically, the Hidden Markov Model includes a set of transition probabilities 12 associated with the transition vectors and a set of output probabilities 14 associated with the observed output at each state. The model is clocked from one state to another at regularly spaced, discrete intervals. At clock-time, the model may change from its current state to any state for which a transition vector exists. As illustrated, a transition can be from a given state back to itself.

The transition probabilities represent the likelihood that a transition from one state to another will occur when the model is clocked. Thus, as illustrated in FIG. 1, each transition has associated with it a probability value (between 0 and 1). The sum of all probabilities leaving any state equals 1. For illustration purposes, a set of exemplary transition probability values has been given in transition probability Table 12. It will be understood that in a working embodiment these values would be generated by the training data, with the constraint that the sum of all probabilities leaving any state equals 1.

Every time a transition is taken, the model can be thought of as emitting or outputting one member of its alphabet. In the embodiment illustrated in FIG. 1, a phoneme-based speech unit has been assumed. Thus the symbols identified in output probability Table 14 correspond to some of the phonemes found in standard English. Which member of the alphabet gets emitted upon each transition depends on the output probability value or function learned during training. The outputs emitted thus represent a sequence of observations (based on the training data) and each member of the alphabet has a probability of being emitted.

In modeling speech, it is common practice to treat the output as a sequence of continuous vectors as opposed to a sequence of discrete alphabet symbols. This requires the output probabilities to be expressed as continuous probability functions, as opposed to single numeric values. Thus HMMs are often based on probability functions comprising one or more Gaussian distributions. When a plurality of Gaussian functions are used they are typically additively mixed together to define a complex probability distribution, as illustrated at 16.

Whether represented as a single Gaussian function or a mixture of Gaussian functions, the probability distributions can be described by a plurality of parameters. Like the transition probability values (Table 12) these output probability parameters may comprise floating point numbers. Parameters Table 18 identifies the parameters typically used to represent probability density functions (pdf) based on observed data from the training speakers. As illustrated by the equation in FIG. 1 at Gaussian function 16, the probability density function for an observation vector O to be modeled is the iterative sum of the mixture coefficient for each mixture component multiplied by the Gaussian density N, where the Gaussian density has a mean vector $\mu_j$ and covariance matrix $U_j$ representing the cepstral or filter bank coefficient speech parameters.

The implementation details of a Hidden Markov Model recognizer may vary widely from one application to another. The HMM example shown in FIG. 1 is intended merely to illustrate how Hidden Markov Models are constructed, and is not intended as a limitation upon the scope of the present invention. In this regard, there are many variations on the Hidden Markov Modeling concept. As will be more fully understood from the description below, the eigenvoice adaptation technique of the invention can be readily adapted to work with each of the different Hidden Markov Model variations, as well as with other parameter-based speech modeling systems.

Constructing the Eigenvcoice Spacse

Figure 2:
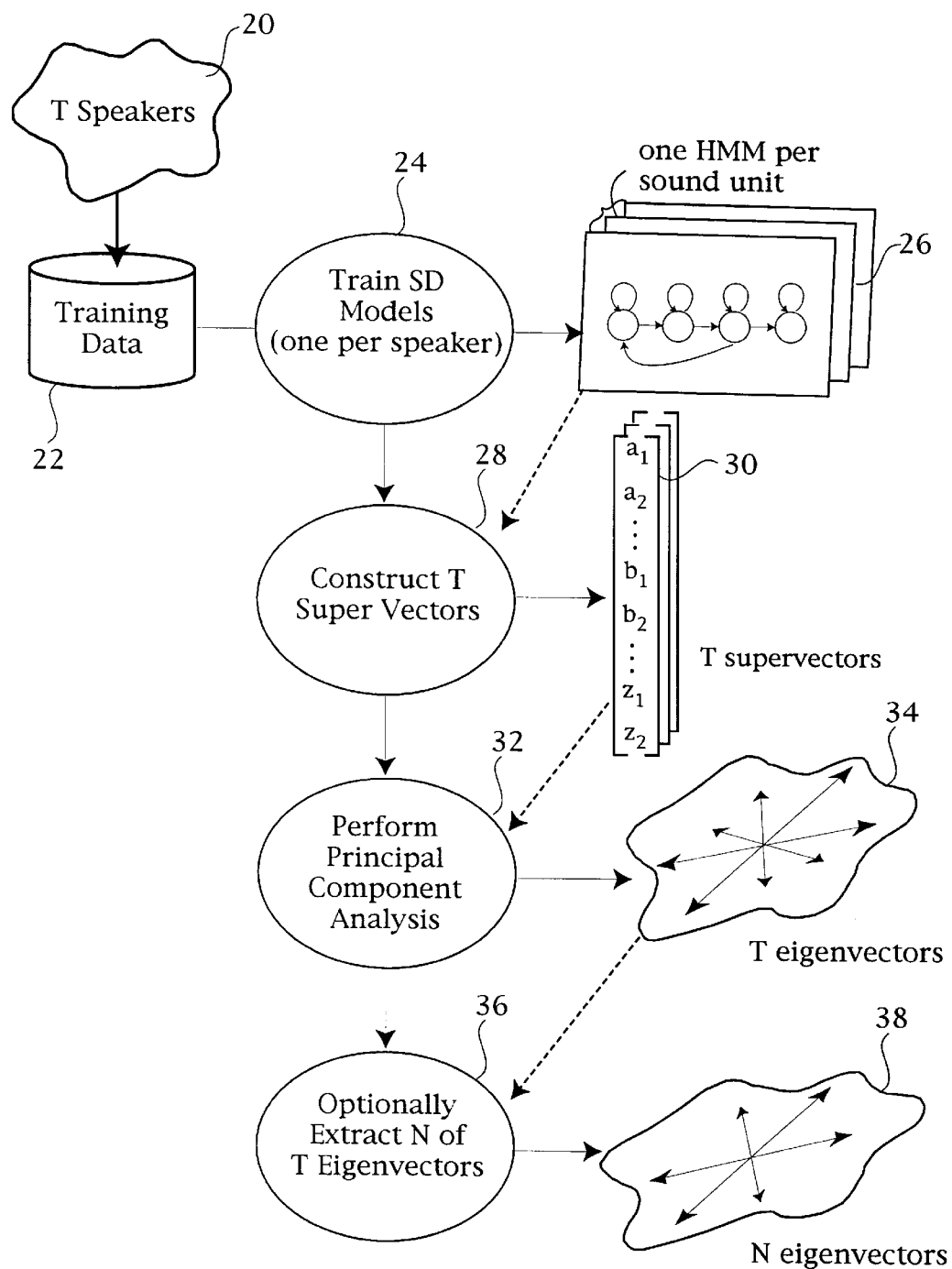
FIG. 2 is a dataflow diagram illustrating how to construct an eigenspace from a plurality of training speakers.

The process for constructing an eigenspace to represent a plurality of training speakers is illustrated in FIG. 2. The illustration assumes a number T of training speakers 20 provide a corpus of training data 22 upon which the eigenspace will be constructed. Preferably, a reasonably large number of speakers (on the order of 100 to 200) provide the training data. These training data are then used to train a speaker dependent (SD) model as illustrated at 24. One model per speaker is constructed at step 24, with each model representing the entire lexicon that is to be understood by the recognition system. In accordance with the description provided with FIG. 1, above, each model can be a set of HMMs, one HMM for each sound unit. This is illustrated in FIG. 2 at 26.

After all training data from T speakers have been used to train the respective speaker dependent models, a set of T supervectors is constructed at 28. Thus there will be one supervector 30 for each of the T speakers. The supervector for each speaker comprises an ordered list of parameters (typically floating point numbers) corresponding to at least a portion of the parameters 18 of the Hidden Markov Models for that speaker. Parameters corresponding to each sound unit are included in the supervector for a given speaker. The parameters may be organized in any convenient order. The order is not critical; however, once an order is adopted it must be followed for all T speakers.

The ordered Hidden Markov Model parameters are then concatenated to form the supervector. The choice of which HMM parameters to include in the supervector may depend on the available processing power. We have found that constructing supervectors from the Gaussian means gives good results. If greater processing power is available, the supervectors may also include other HMM parameters, such as the transition probabilities (Table 12, FIG. 1) or the Covariance matrix parameters (parameters 18, FIG. 1). Naturally, if the Hidden Markov Models generate discrete outputs (as opposed to probability densities) then these output values may be used to comprise the supervector.

After supervectors have been constructed for each of the training speakers, principal component analysis is performed at step 32. Principle component analysis upon T supervectors yields T eigenvectors, as at 34. Thus, if 120 training speakers have been used the system will generate 120 eigenvectors. These eigenvectors define what we call eigenvoice space or eigenspace.

The eigenvectors that make up the eigenvoice space are uncorrelated; they each represent a different dimension across which different speakers may be differentiated. Each supervector in the original training set can be represented as a linear combination of these eigenvectors. The eigenvectors are ordered by their importance in modeling the data: the first eigenvector is more important than the second, which is more important than the third, and so on. Our experiments with this technique thus far show that the first eigenvector appears to correspond to a male-female dimension.

Although a maximum of T eigenvectors is produced at step 32, in practice, it is possible to discard several of these eigenvectors, keeping only the first N eigenvectors. Thus at step 36 we optionally extract N of the T eigenvectors to comprise a reduced parameter eigenspace at 38. The higher order eigenvectors can be discarded because they typically contain less important information with which to discriminate among speakers. Reducing the eigenvoice space to fewer than the total number of training speakers provides an inherent data compression that can be helpful when constructing practical systems with limited memory and processor resources.

Performing the Adaption

Once the eigenvoice space has been constructed, speaker adaptation or environment adaptation can be readily accomplished.

Figure 3:
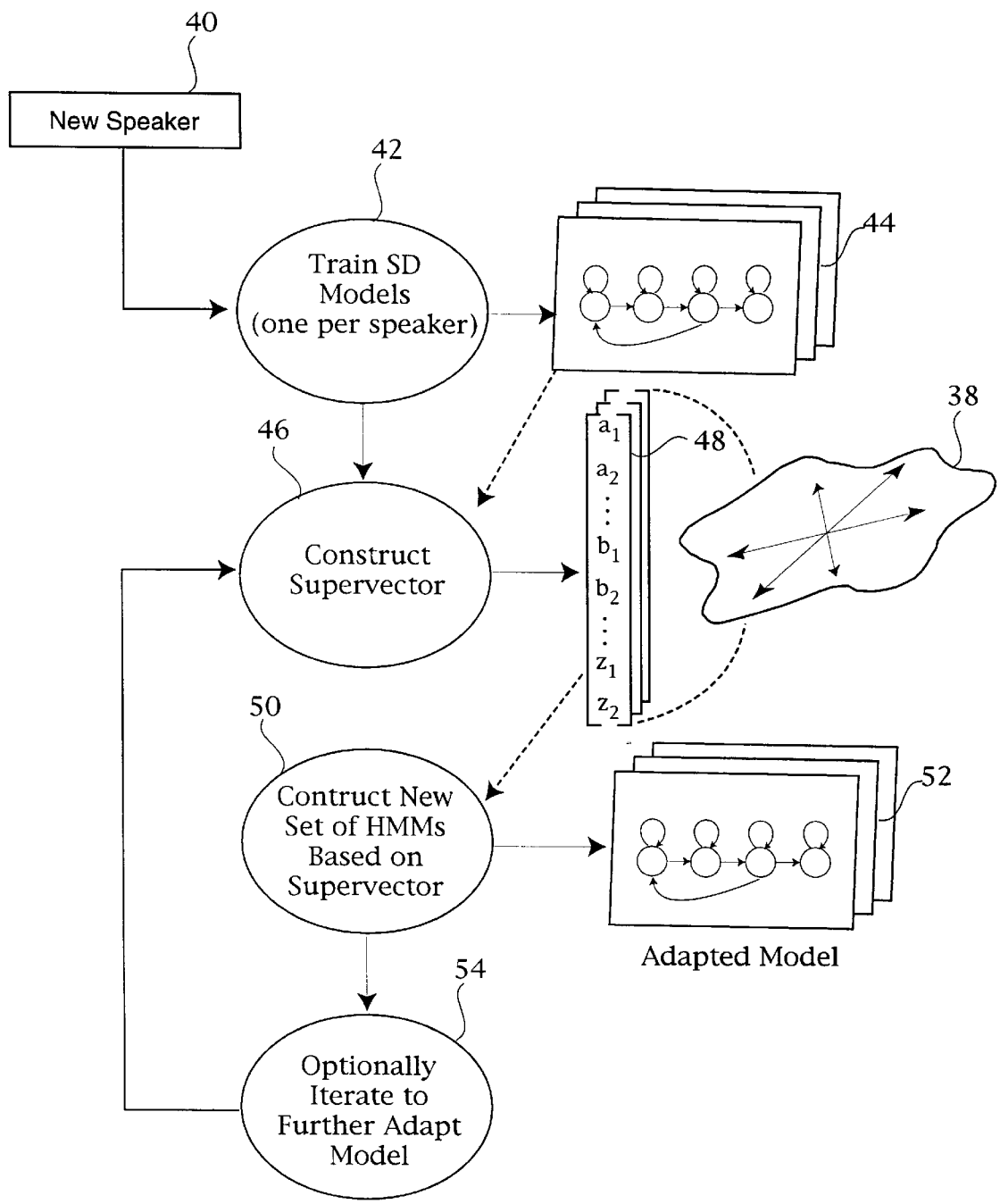
FIG. 3 is a dataflow diagram illustrating how an adapted model is constructed using the eigenvoices in accordance with the invention.

While constructing the eigenspace is somewhat computationally intensive, and is typically conducted offline, adaptation is a comparatively simple computational operation that can be performed while the new speaker is using the system. Referring to FIG. 3, speech from new speaker 40 is used at step 42 to train a speaker dependent model to construct a set of HMMs 44 (one for each sound unit). The speaker dependent model can be trained in either a supervised mode, where the training system knows the content of the training speech in advance, or in an unsupervised mode, where the speech recognition system uses a speaker independent model to determine the content of the adaptation speech.

The speaker dependent model trained on this new speaker will usually be very inadequate for recognition, at least at first. However, the model may nevertheless be used to construct a supervector. The supervector is constructed at step 46 such that the supervector (supervector 48) is constrained to fall within the eigenvoice space 38 previously created from the training speakers. Supervector 48 is constructed with the imposed constraint that the HMM model used for recognition must be a linear combination of the eigenvoices comprising eigenvoice space 38.

The speaker dependent model 44 serves to estimate the linear combination of coefficients that will comprise the adapted model for that new speaker. Thus in step 50 a new set of HMMs is constructed based on supervector 48 to generate the adapted model 52. If desired, an optional iterative process may be performed at 54 to construct a new supervector from the adapted model 52 and thereafter to construct another set of HMMs from which a further adapted model may be constructed.

The constructing of supervector 48 may be accomplished through a computationally simple projection operation or the like, whereby the parameters from the speaker dependent model 44 are projected or otherwise transformed or "placed" into eigenvoice space 38. The precise technique for placing the parameters into eigenspace may depend upon the available computational resources. If resources are limited a simple projection operation may be used; if greater resources are available an optimizing operation may be used to find the point in eigenspace that represents the highest probability or best match with the adaptation data.

In this way, the speaker dependent model 44, trained on adaptation data, is combined with the eigenvoice vectors to obtain a reasonable estimate of the speaker dependent model for the new speaker (the adapted model 52) through a computationally inexpensive operation.

When the new set of HMMs is constructed at step 50, any parameters that were not used in constructing the supervector 48 (if only Gaussian mean vectors were used for example) may be obtained from a previously constructed speaker independent model.

In some instances the adaptation data may have missing sound units (certain sound units were not spoken by the new speaker). Thus the speaker dependent model 44 may not be complete. However, even with missing sound units the eigenvoice adaptation technique will work. At first blush this may seem surprising, however, recall that the eigenvectors are uncorrelated vectors, with the first eigenvector being more important than the second, and so forth. As a result of this, it is possible to derive a significant amount of useful information from the adaptation data, even if some of it is missing.

One way to handle missing sound units is to replace the missing sound unit HMM parameters with corresponding values obtained from a speaker independent model. This is a computationally inexpensive approach, but has the drawback that the adapted model may be quite similar to the speaker independent model when only small amounts of adaptation data are available.

Another approach is to find the point Y in the eigenspace that maximizes the likelihood of the adaptation data, given the adapted model derived from Y. This maximum-likelihood estimator requires that we solve a different set of linear equations during runtime.

Environment Adaptation

While the invention has been described thus far as a speaker adaptation technique, the techniques can be readily extended to environment adaptation. Many speech recognition systems are quite sensitive to environmental conditions, such as microphone placement, room acoustics, background noise, and audio signal channel quality, for example. The eigenvectors can be used to model different speaking environments, just as they are used to model different speakers.

In most instances it is desirable to accommodate the needs of both speaker adaptation and environment adaptation. To do this we simply need to insure that the training speakers are recorded in a wide variety of environments. To obtain good performance, the number of training speakers and number of eigenvoices retained may need to be larger than is necessary for eigenvoice adaptation in a quiet environment. Otherwise, the procedure is the same as described above.

To construct a speaker independent system that adapts to the environment, but not to the speaker, a slight modification to the above technique is used. First, train E speaker independent models, where E is the number of different environments in the training data. Each of the models is trained on many different speakers in the same environment. Ideally, the E different recording environments will be as diverse as possible. Then, the eigenvoice procedure is carried out as described above. In this case, the eigenvoice vectors will represent the components of variation between environments. Thus the first eigenvector may or may not represent the male-female dimension as it did in the speaker adaptation example.

While the invention has been described in its presently preferred embodiment, it will be appreciated that the invention can be adapted to a variety of different uses. Accordingly, the preceding examples are intended to teach the concepts of the invention without limitation upon the scope of the appended claims.

What is claimed is:

1. A method for performing speaker adaptation comprising the steps of:

constructing an eigenspace to represent a plurality of training speakers by providing a set of models for said training speakers and performing principal component analysis upon said set of models to generate a set of principal component vectors that define said eigenspace, said principal component vectors being equal in number to the number of training speakers; and generating an adapted model, using input speech from a new speaker to train said adapted model, while using said set of principal component vectors to constrain said adapted model such that said adapted model lies within said eigenspace.

2. The method of claim 1 wherein said models for said training speakers define a plurality of model parameters and said step of constructing an eigenspace comprises concatenating said model parameters for said plurality of training speakers to construct a set of supervectors and performing principal component analysis upon said supervectors to thereby generate said principal component vectors.

3. The method of claim 2 wherein said models for each of said training speakers correspond to a set of different speech units and wherein each supervector is defined as a concatenation of model parameters corresponding to said speech units sorted in a predetermined order.

4. The method of claim 2 wherein said model parameters are cepstral coefficients.

5. The method of claim 2 wherein said model parameters are filter bank coefficients.

6. The method of claim 1 wherein said step of performing principal component analysis generates an ordered list of principal component vectors and wherein said step of constructing an eigenspace includes discarding a predetermined portion of said ordered list to reduce the order of said eigenspace.

7. The method of claim 1 wherein said step of constraining said adapted model is performed by projecting said input speech into said eigenspace.

8. The method of claim 1 wherein said step of constraining said adapted model is performed by selecting a point in eigenspace based on said input speech.

9. A method for performing speaker adaptation comprising the steps of:

constructing an eigenspace to represent a plurality of training speakers by providing a set of models for said training speakers and performing principal component analysis upon said set of models to generate a set of principal component vectors that define said eigenspace, said principal component vectors being equal in number to the number of training speakers;

generating an adapted model, using input speech from a new speaker to train said adapted model, while using at least some of the principal component vectors to constrain said adapted model such that said adapted model lies within said eigenspace.

10. The method of claim 9 wherein said models for said training speakers define a plurality of model parameters and said step of constructing an eigenspace comprises concatenating said model parameters for said plurality of training speakers to construct a set of supervectors and performing principal component analysis upon said supervectors to thereby generate said principal component vectors.

11. The method of claim 10 wherein said models for each of said training speakers correspond to a set of different speech units and wherein each supervector is defined as a concatenation of model parameters corresponding to said speech units sorted in a predetermined order.

12. The method of claim 10 wherein said model parameters are cepstral coefficients.

13. The method of claim 10 wherein said model parameters are filter bank coefficients.

14. The method of claim 9 wherein said step of performing principal component analysis generates an ordered list of principal component vectors and wherein said step of constructing an eigenspace includes discarding a predetermined portion of said ordered list to reduce the order of said eigenspace.

15. The method of claim 9 wherein said step of constraining said adapted model is performed by projecting said input speech into said eigenspace.

16. The method of claim 9 wherein said step of constraining said adapted model is performed by selecting a point in eigenspace based on said input speech.

* * * * *

UNITED STATES PATENT AND TRADEMARK OFFICE
CERTIFICATE OF CORRECTION

PATENT NO. : 6,327,565 B1
DATED : December 4, 2001
INVENTOR(S) : Roland Kuhn et al.

It is certified that error appears in the above-identified patent and that said Letters Patent is hereby corrected as shown below:

<u>Column 7,</u>
Line 16, after the word "to", add the words -- at least some of --.
Line 18, after the word "using", add the words -- at least some of --.

Signed and Sealed this

Tenth Day of December, 2002

JAMES E. ROGAN
*Director of the United States Patent and Trademark Office*